United States Patent [19]
Aizawa

[11] Patent Number: 5,964,658
[45] Date of Patent: Oct. 12, 1999

[54] AIR PASSAGE OPENING/CLOSING SYSTEM FOR AIR CONDITIONING APPARATUS

[75] Inventor: Hideo Aizawa, Kariya, Japan

[73] Assignee: Denso Corporation, Kariya, Japan

[21] Appl. No.: 09/052,787

[22] Filed: Mar. 31, 1998

[51] Int. Cl.[6] .................................................. B60H 3/00
[52] U.S. Cl. ........................................ 454/156; 454/121
[58] Field of Search .................................. 454/156, 160, 454/159, 121; 251/901

[56] References Cited

U.S. PATENT DOCUMENTS 5,326,315  7/1994  Inoue et al. ............................... 454/126
5,653,630  8/1997  Higashihara ............................. 454/121

FOREIGN PATENT DOCUMENTS 64-85809  3/1989  Japan .

Primary Examiner—Harold Joyce
Assistant Examiner—Derek S. Boles
Attorney, Agent, or Firm—Harness, Dickey & Pierce, PLC

[57] ABSTRACT

An air passage opening/closing system includes a case having a casing opening portion, and a film door having a plurality of door opening portions. The case has a thin portion extending from a peripheral portion of the casing opening portion in a moving direction of the film door. In the system, a distance between the peripheral portion of the casing opening portion and the film door is not smaller than 5 mm, the case has a thick portion connected to the thin portion, and the thick portion contacts the film door to have a predetermined friction therebetween during moving the film door. Therefore, air flowing from a door opening portion collides with an inner surface of the thin portion of the case so that a flow rate of air is reduced, and then expands in a space between the thin portion of the case and the film door so that the flow rate of air is further reduced. Thus, it can prevent a whistle noise from being caused when the casing opening portion starts opening, while keeping an excellent airtightness of the system when the casing opening portion is fully closed.

17 Claims, 6 Drawing Sheets

AIR PASSAGE OPENING/CLOSING SYSTEM FOR AIR CONDITIONING APPARATUS

CROSS REFERENCE TO RELATED APPLICATION

This application relates to and incorporates herein by reference Japanese Patent Application No. 8-105653 filed on Apr. 25, 1996.

BACKGROUND OF THE INVENTION

1. Field of the Invention

The present invention relates to an air passage opening/closing system for opening and closing an air passage by moving a flexible film door having a plurality of door opening portions. The air passage opening/closing system is suitable for various equipments such as an air conditioning apparatus.

2. Related Art

As shown in FIG. 8, JP-A-64-85809 proposes an air passage opening/closing system applied to an automotive air conditioning apparatus. The air passage opening/closing system includes an air conditioning case (not shown) for forming an air passage. A driving shaft 101 and a driven shaft 102 are rotatably held in the air conditioning case. One end of a flexible film 104 having a plurality of film opening portions 103 is wound around the driving shaft 101 and the other end of the film 104 is wound around the driven shaft 102 to move the film 104 between the driving shaft 101 and the driven shaft 102.

Pulleys 105 and 106 are connected to longitudinal ends of the driving shaft 101 and the driven shaft 102 respectively in alignment. One end of a flexible wire 107 is wound on the pulley 105 and the other end of the wire 107 is wound on the pulley 106. The winding direction of the wire 107 is opposite to a winding direction of the film 104. An actuator 108 (e.g., electric motor) for driving the driving shaft 101 is connected to the driving shaft 101. When the actuator 108 rotates the driving shaft 101 forward and backward, the film 104 also moves forward and backward respectively.

When the driving shaft 101 rotates in a direction indicated by arrow A, the film 104 is wound around the driving shaft 101 to move in a forward direction (i.e., in a direction indicated by arrow B in FIG. 8). On the other hand, when the driving shaft 101 rotates in a direction opposite to the direction indicated by the arrow A, the film 104 is rewound around the driving shaft 101 and the wire 107 is wound around the pulley 105. Therefore, the driven shaft 102 rotates in a direction indicated by arrow C so that the film 104 is wound around the driven shaft 102 to move a backward direction (i.e., in a direction indicated by arrow D in FIG. 8).

The air conditioning case has a casing opening portion. When the film opening portions 103 match the casing opening portion while the film 104 moves forward and backward, the casing opening portion is opened. When the film opening portions 103 do not match the casing opening portion, the casing opening portion is closed. To prevent peripheral portions of the film opening portions 103 from being caught on a peripheral portion of the casing opening portion while the film 104 moves, each of the film opening portions 103 is formed in a hexagon shape in such a manner that a diagonal line connecting two sharper corners of each hexagon is parallel to the moving direction of the film 104.

However, as a result of studies and examinations of the air passage opening/closing system which has been produced experimentally, a harsh jarring noise having a high frequency about 9 kHz (hereinafter referred to as whistle noise) may sound when the casing opening portion starts opening. Because of the hexagon shape of each film opening portion 103, the width of each film opening portion 103 in a direction perpendicular to the moving direction of the film 104 decreases toward the ends of the film openings 103 in the moving direction. Thus, when the casing opening portion of the air conditioning case is starting to open by the casing opening portion of the film 104, an initial opened area of the casing opening portion is small as compared to a case where each film opening portion has a rectangular shape. That is, at the starting time for opening the casing opening portion, air flows from the casing opening portion with a very fast speed and may cause the whistle noise due to friction between air flowing from the casing opening portion and air outside the air conditioning case.

SUMMARY OF THE INVENTION

It is an object of the present invention to provide an air passage opening/closing system which prevents a whistle noise from being caused when a casing opening portion of a case starts opening.

It is an another object of the present invention to provide an air conditioning apparatus using an air passage opening/closing system which can prevent a whistle noise from being caused when a casing opening portion of an air conditioning case starts opening.

According to the present invention, an air passage opening/closing system includes a case having a casing opening portion, and a film member having a film opening portion. The case has a first wall member extending from a peripheral end of the casing opening portion in a longitudinal direction of the film member, the first wall member has an inner surface to which air flowing from the film opening portion crosses, and the first wall member is disposed to form a predetermined distance between the peripheral end of the casing opening portion on the inner surface of the first wall member and the film member. The predetermined distance in a direction perpendicular to the longitudinal direction of the film member is set to 5 mm or more. Thus, air flowing from a small opening formed by matching the film opening portion to the casing opening portion collides with the inner surface and expands in a space between the first wall member and the film member to be expended so that the flow speed of air is reduced. As a result, friction between air flowing from the casing opening portion and air outside the case can be reduced to prevent the whistle noise from being caused.

Preferably, the case has a second wall member connected to the first wall member in the longitudinal direction of the film member, and the second wall member has a thickness thicker than that of the first wall member. Therefore, it can prevent air being leaked from a space between the film member and the case when the film member fully closes the casing opening portion of the case.

More preferably, the peripheral end of the casing opening portion is inclined relative to the longitudinal direction of the film member to have an inclined angle therebetween, and the inclined angle is 90° or less. Therefore, an opening angle between the peripheral end of the casing opening portion and a peripheral end of the film opening portion becomes large, resulting in reduction of a speed of air flowing from the casing opening portion. Thus, it can sufficiently prevent the whistle noise from being caused.

BRIEF DESCRIPTION OF THE DRAWINGS

These and other objects and features of the present invention will become more readily apparent from the following detailed description of a preferred embodiment when taken together with the accompanying drawings, in which.

DETAILED DESCRIPTION OF THE PREFERRED EMBODIMENT

Figure 1:
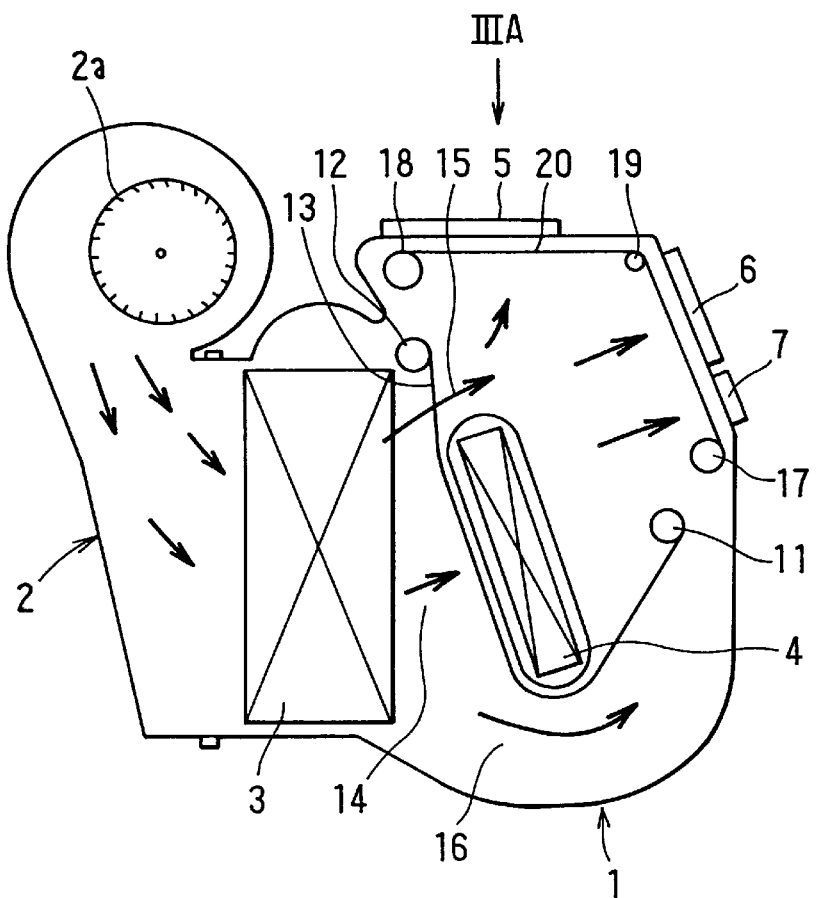
FIG. 1 is a schematic diagram showing an air conditioning apparatus for a vehicle according to a preferred embodiment of the present invention.

A preferred embodiment of the present invention will be described hereinafter with reference to FIGS. 1–7. In the embodiment, an air passage opening/closing system is applied to an air conditioning apparatus for a vehicle. As shown in FIG. 1, the air conditioning apparatus includes an air conditioning case 1 made of formable resin such as polypropylene. The air conditioning case 1 forms an air passage therein, and a blower unit 2 including a fan 2a is disposed in the air conditioning case 1 at the most upstream air side. By driving the fan 2a, air flows into the air conditioning case 1.

The air conditioning case 1 also accommodates an evaporator 3 and a heater core 4. The evaporator 3 is disposed at an upstream air side of the heater core 4. The evaporator 3 is a cooling heat exchanger which constitutes a well-known refrigerant cycle with a compressor, a condenser and a decompressor, and cools air passing through the air passage within the air conditioning case 1. The heater core 4 is a heating heat exchanger in which cooling water for cooling an engine flows, and heats air passing therethrough. The air conditioning case 1 has three casing opening portions 5, 6 and 7 at a downstream air side thereof. Ducts (not shown) for guiding conditioned air into each position in a passenger compartment are provided at each downstream air side of the opening portions 5, 6 and 7. The casing opening portion 5 is communicated with a defroster air outlet through a defroster duct for leading conditioned air toward an inner surface of a windshield, the casing opening portion 6 is communicated with a center face air outlet through which conditioned air is blown toward the upper portion of a passenger seated on a front seat in the passenger compartment, and the casing opening portion 7 is communicated with a front foot air outlet through which conditioned air is blown toward the foot area of the passenger seated on the front seat in the passenger compartment.

A first driving shaft 11 and a first driven shaft 12 are rotatably held in the air conditioning case 1. One end of an air mixing door 13 made of flexible film is wound and secured on the first driving shaft 11 and the other end of the air mixing door 13 is wound and secured on the first driven shaft 12. The air mixing door 13 is held by the first driving shaft 11, the first driven shaft 12 and a side surface of the heater core 4, and extends to cross a warm air passage 14. By providing the air mixing door 13, air having been passed through the evaporator 3 can be separated to pass through the heater core 4 and bypass air passages 15 and 16 through which air bypasses the heater core 4.

The first driving shaft 11 is driven by an actuator such as a stepping motor. The rotation of the first driving shaft 11 is transmitted to the first driven shaft 12 via a rotation transmission unit (not shown). When the stepping motor rotates the driving shaft 11 forward and backward, the air mixing door 13 moves forward and backward respectively in a longitudinal direction of the air mixing door 13. The air mixing door 13 has a door opening portion (not shown) through which air flows. Therefore, by moving the air mixing door 13 in the longitudinal direction thereof at a position, each amount of air flowing through the warm air passage 14 and the bypass air passages 15 and 16 can be adjusted.

Further, a second driving shaft 17 driven by an actuator such as a stepping motor, a second driven shaft 18 and an intermediate shaft 19 are also rotatably held in the air conditioning case 1. The second driven shaft 18 and the intermediate shaft 19 rotate in accordance with the second driving shaft 17 by a rotation transmission unit (not shown). One end of an air outlet mode door 20 (i.e., film member, film door) made of flexible film is wound and secured on the second driving shaft 17, and the other end of the air outlet mode door 20 is wound and secured on the second driven shaft 18. The air outlet mode door 20 is held under tension by the second driving shaft 17, the second driven shaft 18 and the intermediate shaft 19, and extends over the casing opening portions 5, 6 and 7.

Figure 2:
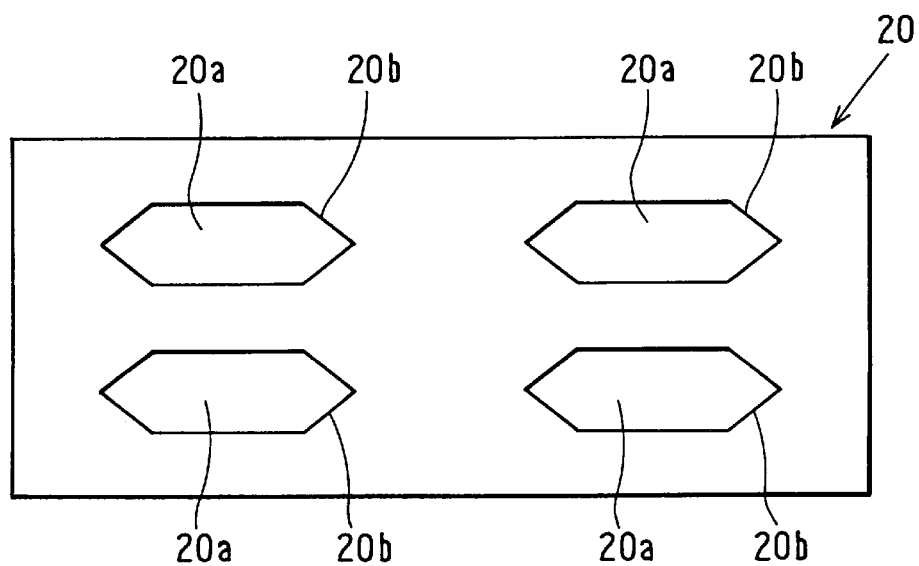
FIG. 2 is a plan view showing an air outlet mode door according to the embodiment.

As shown in FIG. 2, the air outlet mode door 20 has a plurality of door opening portions 20a. Each door opening portion 20a has a shape of a hexagon, and is provided so that a diagonal line connecting two sharper angles of the hexagon is parallel to a moving direction of the air outlet mode door 20. This prevents each peripheral portion 20b of the door opening portions 20a from being caught on a peripheral portion 5a extending from peripheral end of casing opening portion 5. Therefore, by moving the air outlet mode door 20 in the longitudinal direction using the stepping motor to be stopped at a position, an air outlet mode is selected.

In the air conditioning case 1, a cool air bypass passage (not shown) for leading cool air directly to the casing opening portions 6 and 7 is provided, and a cool air bypass passage door (not shown) for opening and closing the cool air bypass passage is also disposed. When the air mixing door 13 fully closes the warm air passage 14 and fully opens the bypass passages 15 and 16, the cool air bypass passage door opens the cool air bypass passage.

Figure 3A:
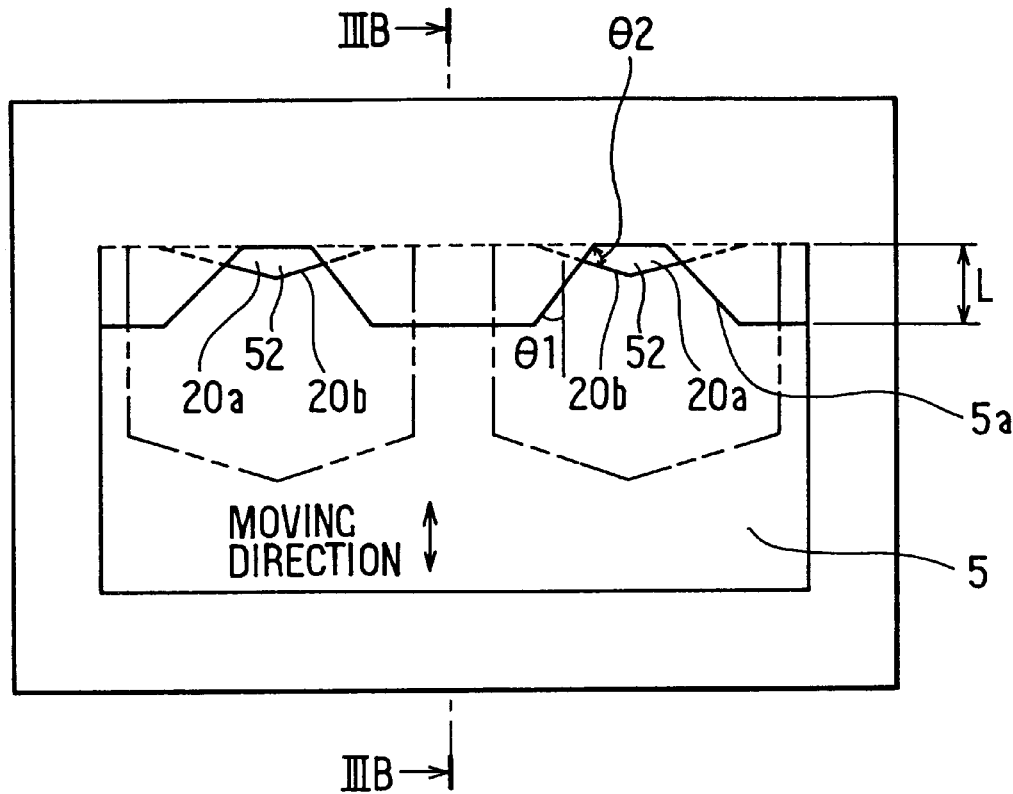
FIG. 3A is a top view taken from arrow IIIA in FIG. 1 showing a casing opening portion and a door opening portion.
Figure 3B:
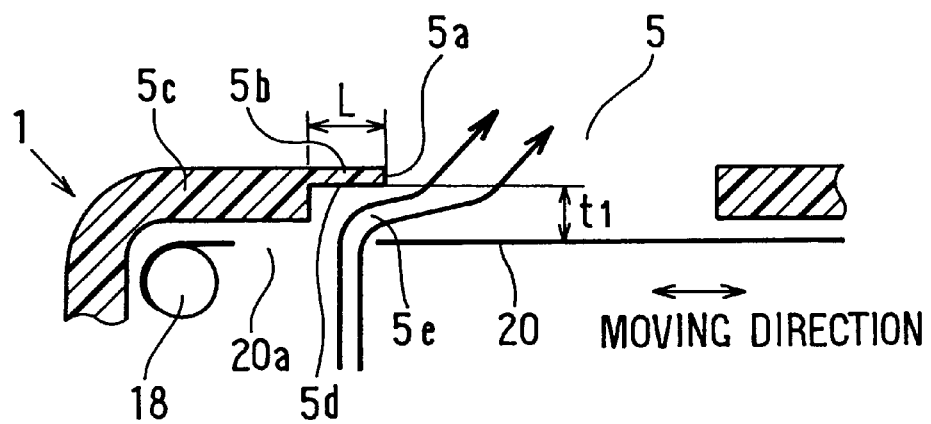
FIG. 3B is a cross-sectional view taken along line IIIB—IIIB in FIG. 3A showing an air conditioning case and the air outlet mode door according to the embodiment.

As shown in FIG. 3B, a distance between the peripheral portion 5a of the casing opening portion 5 of the air conditioning case 1 and the air outlet mode door 20 is set at t1 (t1>0). The distance t1 is set to have 5 mm or over to reduce the whistle noise as described later. Further, the distance t1 is determined in consideration of interference of other parts located in the vicinity. The distance t1 is preferably in a range of 5–10 mm.

The air conditioning case 1 has a thin portion 5b which is thinner than the other part of the air conditioning case 1. The thin portion 5b extends from the peripheral portion 5a of the casing opening portion 5 with a dimension L in a moving direction of the air outlet mode door 20. The thin portion 5b has an inner wall 5d so that air from the door opening portion 20a crosses the inner wall 5d. The air conditioning case 1 has a thick portion 5c which is connected to the thin portion 5b stepwise. The thick portion 5c contacts the air outlet mode door 20 in a degree that too much friction is not generated therebetween during moving the air outlet mode door 20. In the embodiment, the dimension L is determined according to the distance t1, the shape of the casing opening portion 5, the shape of the door opening portion 20a, the amount of air flowing from the casing opening portion 5, and an air flow rate at which the whistle noise is readily generated. Preferably, the dimension L is in a range of 5–6 mm. That is, when the dimension L is in the range of 5–6 mm, it can effectively prevent the whistle noise from being generated. In FIGS. 1 and 3B, the air outlet mode door 20 is illustrated as being apart from the thick portion ac to have a predetermined distance to readily explain. However, actually, the air outlet mode door 20 contacts the thick portion 5C, as described above. Further, as shown in FIG. 3A, the peripheral portion 5a is inclined relative to the moving direction of the air outlet mode door 20 by an angle θ1 (hereinafter referred to as opening angle θ1).

Next, referring to FIGS. 3A and 3B, the casing opening portion 5 is specifically described. Although FIGS. 3A and 3B illustrate only the casing opening portion 5 of the air conditioning case, each of the casing opening portions 6 and 7 have the same structure as the casing opening portion 5, and the explanation is omitted.

When the air outlet mode door 20 moves toward the casing opening portion 5 so that the casing opening portion 5 is slightly opened with a slight opening 52 by the door opening portion 20a of the air outlet mode door 20, air flows from the opening 52 with a very fast speed and collides with the inner wall 5d of the thin portion 5b. Therefore, the speed of air flowing from the casing opening portion 5 is reduced, and friction between air flowing from the opening 52 and air inside the defroster duct is also reduced. Therefore, the noise caused by the air friction can be extremely reduced. Further, because the peripheral portion 5a of the casing opening portion 5 is provided at the distance t1 from the air outlet mode door 20 to have a space 5e therebetween, air flowing from the opening 52 with a high speed does not directly flow into the defroster duct. That is, before flowing into the defroster duct, air firstly flows into the space 5e to be expended so that the flow speed of air is reduced. Therefore, the friction between air flowing from the opening 52 and air inside the defroster duct is further reduced to reduce the noise.

As shown in FIG. 3A, the peripheral portion 5a of the casing opening portion 5 and the peripheral portion 20b of the door opening portion 20a have an angle θ2 (hereinafter referred to as opening angle θ2) therebetween. The smaller the opening angle θ2 is, the faster the air flow from the opening 52. In this embodiment, because the angle θ1 of the peripheral portion 5a relative to the moving direction of the air outlet mode door 20 is smaller than 90°, the opening angle θ2 can be made large. Therefore, the flow rate of air flowing from the opening 52 can be reduced. This further reduces the friction between air flowing from the opening 52 and air staying in the defroster duct to prevent whistle noise from being caused.

Figure 4:
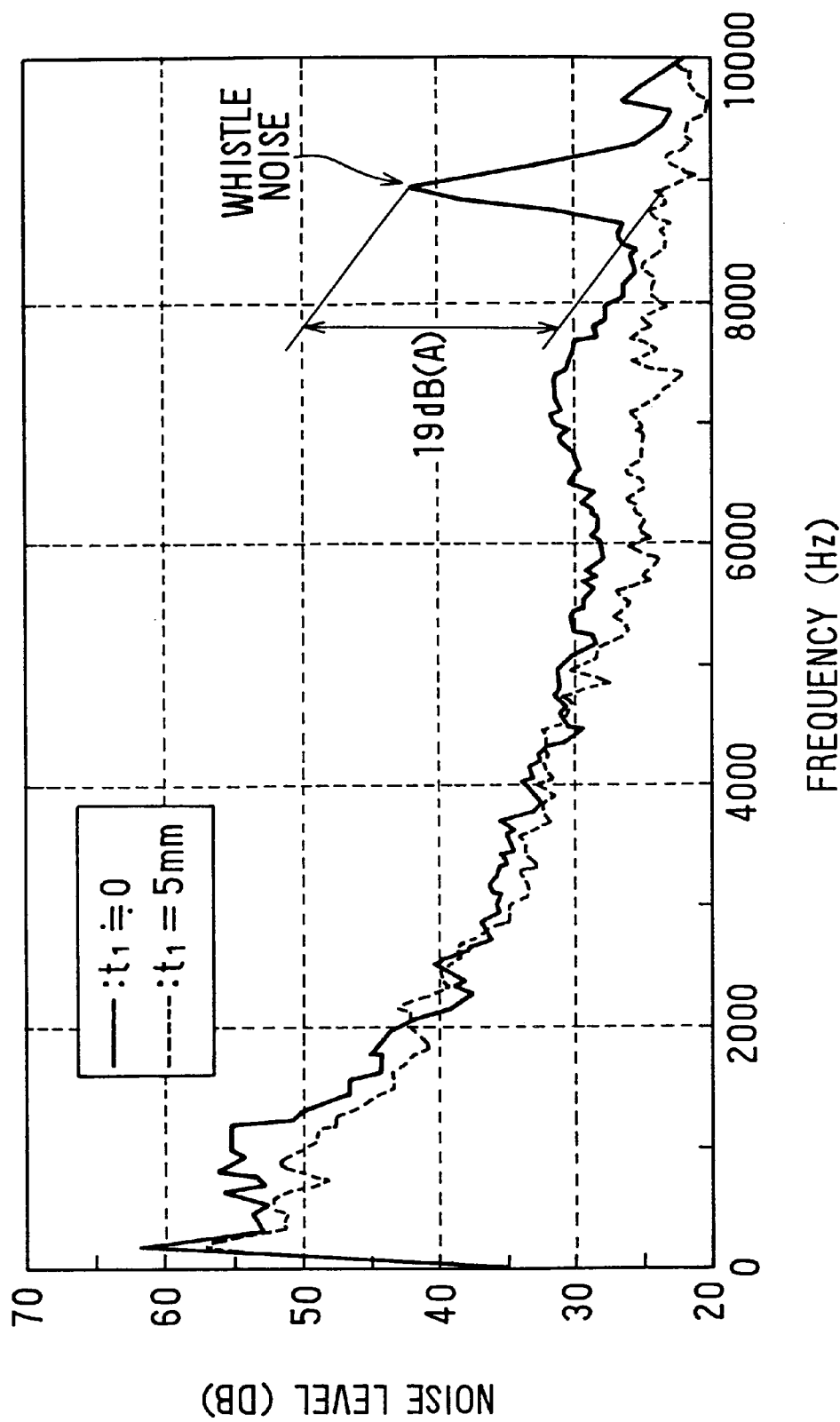
FIG. 4 is a graph showing noise characteristics of two kinds of air passage opening/closing systems according to the embodiment.

As a result of examinations of the air conditioning apparatus having the air passage opening/closing system, which has been produced experimentally, the whistle noise generated during operation of the air passage opening/closing system is reduced by an approximately 19 dB (A) as shown in FIG. 4, when the distance t1 is set to 5 mm. That is, the whistle noise is greatly reduced by setting the distance t1 to 5 mm. In FIG. 4, the broken line represents the air passage opening/closing system provided with the thin portion 5b where the distance t1 is set to 5 mm. The solid line represents an air passage opening/closing system without the thin portion 5b where the distance t1 is set to 0 mm. The other conditions of both the systems are same except the distance t1.

Further, because the thick portion 5c contacts the air outlet mode door 20 in a degree that not too much friction is generated therebetween while the air outlet mode changing door 20 moves, it can prevent air from being leaked between the air outlet mode door 20 and the air conditioning case 1 when the air outlet mode door 20 fully closes the casing opening 5.

As described above, according to present invention of the embodiment, it can prevent the whistle noise from being generated while preventing air from being leaked from a clearance between the air outlet mode door 20 and the air conditioning case 1.

Although the present invention has been fully described in connection with preferred embodiment thereof with reference to the accompanying drawings, it is to be noted that various changes and modifications will become apparent to those skilled in the art.

Figure 5:
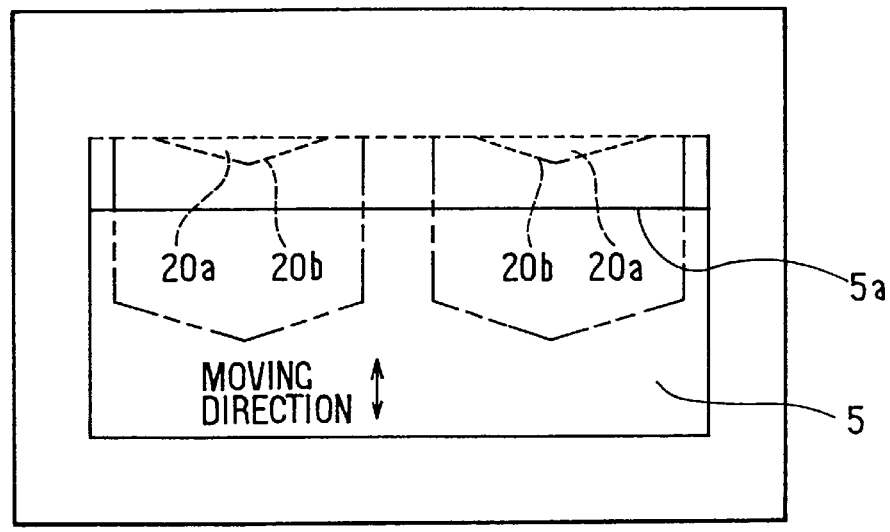
FIG. 5 is a top view corresponding to FIG. 3A according to a modification of the embodiment.

For example, in the above-described embodiment, the opening angle θ1 is smaller than 90°; however, the opening angle θ1 may be 90° as shown in FIG. 5.

Figure 6A:
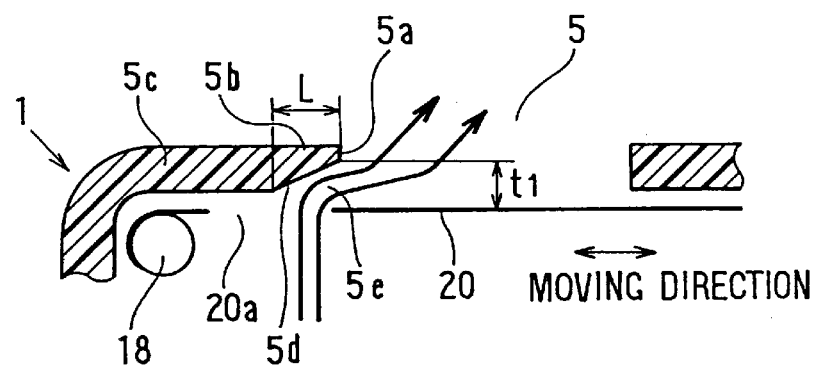
FIG. 6A and 6B are cross-sectional views corresponding to FIG. 3B according to an another modification of the embodiment.
Figure 6B:
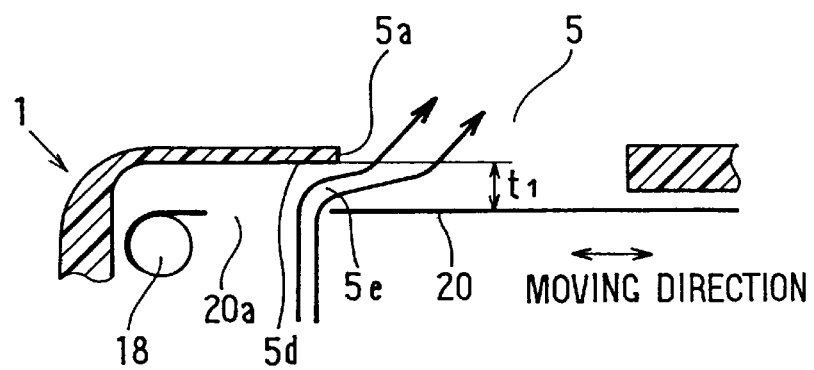

In the above-described embodiment, the thin portion 5b of the air conditioning case 1 has a uniform thickness thinner than the thick portion 5c to form a step shape therebetween; however, the thin portion 5b may be tapered toward the peripheral portion 5a of the casing opening portion 5 as shown in FIG. 6A. Further, the thin portion 5b of the air conditioning case 1 may be formed by a uniform thickness to extend in the moving direction of the air outlet mode door 20 as shown in FIG. 6B with the distance t1 in a range of 5–10 mm.

Figure 7A:
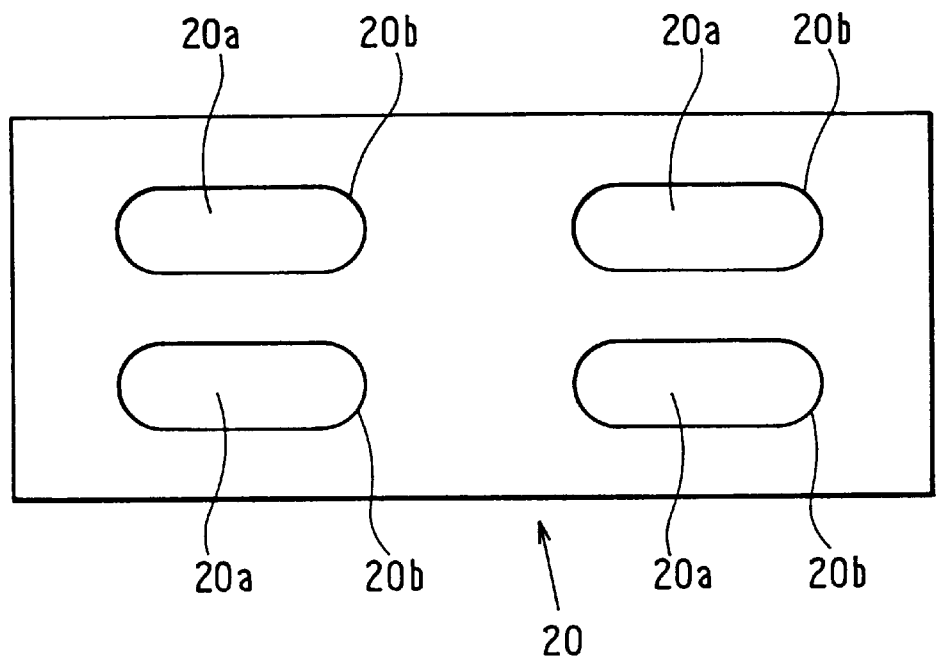
FIG. 7A and 7B are plan views respectively showing air outlet mode doors according to a further another modification of the embodiment.
Figure 7B:
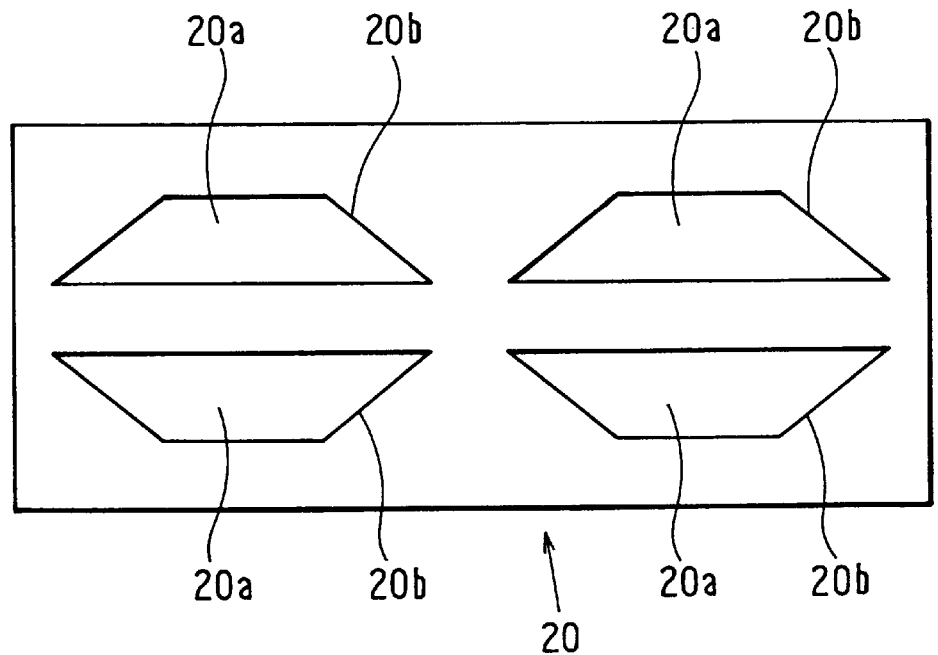
Figure 8:
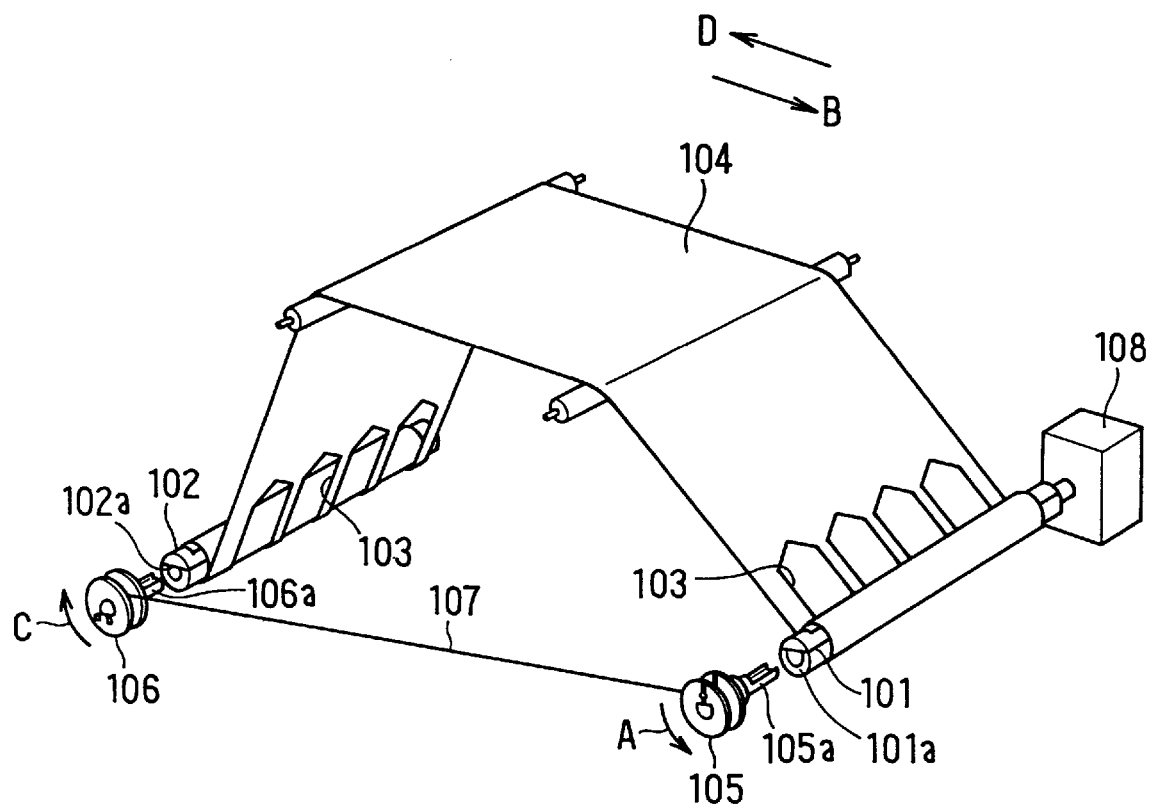
FIG. 8 is a partial perspective view of a conventional air passage opening/closing system.

In the above-described embodiment, the door opening portion 20a is formed into a hexagon so that each end of the door opening portions 20a in the moving direction has a triangular shape; however, each end of the door opening portion 20a in the moving direction may be formed in an arch shape or the door opening portion 20a may be formed in a trapezoid shape as shown in FIGS. 7A and 7B respectively. Further, the door opening portion 20a may be formed in any other shapes where the dimension in the direction perpendicular to the moving direction of the air outlet mode door 20 is reduced toward both ends of the door opening portion 20a in the moving direction thereof.

Such changes and modifications are to be understood as being within the scope of the present invention as defined by the appended claims.

What is claimed is:

1. An air passage opening/closing system comprising:
   a case for forming an air passage, said case having a casing opening portion through which air flows outside; and
   a film member, disposed under tension to be opposite to said casing opening portion at an upstream air side of said casing opening portion, for opening and closing said casing opening portion, said film member having a film opening portion which is tapered at both ends thereof in a longitudinal direction of said film member, wherein:

said film member is controlled to move in the longitudinal direction of said film member to open and close said casing opening portion of said case;

said case has a first wall member extending from a peripheral end of said casing opening portion by a predetermined length in the longitudinal direction of said film member, said first wall member has an inner surface to which air flowing from said film opening portion crosses;

said first wall member is disposed to form a predetermined distance between said peripheral end of said casing opening portion on said inner surface of said first wall member and said film member, said predetermined distance in a vertical direction perpendicular to the longitudinal direction of said film member being 5 mm or more;

said case has a contacting inner surface approximately contacting said film member; and said inner surface of said first wall member is recessed from said contacting inner surface in said vertical direction.

2. The air passage opening/closing system according to claim 1, wherein:

said case has a second wall member connected to said first wall member in the longitudinal direction of said film member; and said second wall member has a thickness thinker than that of said first wall member.

3. The air passage opening/closing system according to claim 2, wherein said second wall member has an inner surface which contacts said film member to have a predetermined friction therebetween when said film member moves.

4. The air passage opening/closing system according to claim 1, wherein:

said peripheral end of said casing opening portion is inclined relative to the longitudinal direction of said film member to have an inclined angle therebetween; and the inclined angle is 90° or less.

5. The air passage opening/closing system according to claim 1, wherein said predetermined distance in the direction perpendicular to the longitudinal direction of said film member is in a range of 5–10 mm.

6. The air passage opening/closing system according to claim 2, wherein:

said first wall member has an uniform thickness thinner than said second wall member; and said first wall member is connected to said second wall member to form an uniform distance between the inner surface and said film member, the uniform distance being 5 mm or more.

7. The air passage opening/closing system according to claim 2, wherein:

said inner surface of said first wall member is inclined relative to the longitudinal direction of said film member in such a manner that the thickness of said first wall member is gradually reduced from said second wall member toward said peripheral portion of said casing opening portion.

8. An air conditioning apparatus for a vehicle having a passenger compartment, said apparatus comprising:

a case for forming an air passage, said case having a casing opening portion through which air is blown toward the passenger compartment;

a heat exchanger, disposed in said case, for adjusting a temperature of air blown toward said casing opening portion; and a film member, disposed under tension to be opposite to said casing opening portion, for opening and closing said casing opening portion, said film member having a film opening portion which is tapered at both ends thereof in a longitudinal direction of said film member, wherein:

said film member is controlled to move in the longitudinal direction of said film member to open and close said casing opening portion of said case;

said case has a first wall member extending from a peripheral end of said casing opening portion by a predetermined length in the longitudinal direction of said film member, said first wall member has an inner surface to which air flowing from said film opening portion crosses;

said first wall member is disposed to form a space between said first wall member and said film member in such a manner that air flowing from said film opening portion expends in said spacer said case has a contacting inner surface approximately contacting said film member; and said inner surface of said first wall member is recessed from said contacting inner surface in a direction perpendicular to the longitudinal direction of said film member.

9. The air conditioning apparatus according to claim 8, wherein:

said wall member is disposed to form a predetermined distance between said peripheral end of said casing opening, portion on said inner surface of said first wall member and said film member, said predetermined distance in a direction perpendicular to the longitudinal direction of said film member being 5 mm or more.

10. The air conditioning apparatus according to claim 9, wherein:

said peripheral end of said casing opening portion is inclined relative to the longitudinal direction of said film member to have an inclined angle therebetween; and the inclined angle is 90° or less.

11. The air conditioning apparatus according to claim 9, wherein the predetermined distance is in a range of 5 mm–10 mm.

12. The air conditioning apparatus according to claim 9, wherein said case has a second wall member connected to said first wall member; and said second wall member has a thickness thinker than that of said first wall member, and an inner surface which contacts said film member to have a predetermined friction therebetween when said film member moves.

13. The air passage opening/closing system according to claim 1, wherein the predetermined length of said first wall member extending from said peripheral end is in a range of 5–6 mm.

14. The air conditioning apparatus according to claim 8, wherein the predetermined length of said first wall member extending from said peripheral end is in a range of 5–6 mm.

15. An air passage opening/closing system comprising:

a case for forming an air passage, said case having a casing opening portion through which air flows outside; and a film member, disposed under tension to be opposite to said casing opening portion at an upstream air side of said casing opening portion, for opening and closing said casing opening portion, said film member having a film opening portion which becomes smaller toward both ends thereof in a longitudinal direction of said film member, wherein:

said film member is controlled to move in the longitudinal direction of said film member to open and close said casing opening portion of said case;

said case has a first wall member extending from a peripheral end of said casing opening portion by a predetermined length in the longitudinal direction of said film member, said first wall member has an inner surface to which air flowing from said film opening portion crosses;

said case has a contacting inner surface slidably contacting said film member; and said inner surface of said first wall member is recessed from said contacting inner surface to be separated from said film member in a direction perpendicular to the longitudinal direction of said film member.

16. An air conditioning apparatus for a vehicle having a passenger compartment, said apparatus comprising:

a case for forming an air passage, said case having a casing opening portion through which air is blown toward the passenger compartment;

a heat exchanger, disposed in said case, for adjusting a temperature of air blown toward said casing opening portion; and a film member, disposed under tension to be opposite to said casing opening portion, for opening and closing said casing opening portion, said film member having a film opening portion which becomes smaller toward both ends thereof in a longitudinal direction of said film member, wherein:

said film member is controlled to move in the longitudinal direction of said film member to open and close said casing opening portion of said case;

said case has a first wall member extending from a peripheral end of said casing opening portion in the longitudinal direction of said film member, said first wall member has an inner surface to which air flowing from said film opening portion crosses;

said case has a contacting inner surface slidably contacting said film member; and said inner surface of said first wall member is recessed from said contacting inner surface to be separated from said film member in a direction perpendicular to the longitudinal direction of said film member.

17. An air passage opening/closing system comprising:

a case for forming an air passage, said case having a casing opening through which air flows; and a film member disposed under tension to be adjacent said casing opening at an upstream air side of said casing opening, said film member opening and closing said casing opening, said film member having a film opening which is tapered at both ends thereof in a longitudinal direction of said film member, wherein:

said film member is controlled to move in the longitudinal direction of said film member to open and close said casing opening of said case;

said case has a first wall member extending into said casing opening in the longitudinal direction of said film member, said first wall member has an inner surface generally parallel to said film member onto which air flowing from said film opening is directed; and said first wall member is disposed to form a predetermined distance between said inner surface of said first wall member and said film member, said predetermined distance in a direction perpendicular to the longitudinal direction of said film member being 5 mm or more.

* * * * *